United States Patent [19]

Nissen

[11] Patent Number: 4,758,593
[45] Date of Patent: Jul. 19, 1988

[54] METHOD OF FEEDING KETOISOCAPROATE TO LACTATING DOMESTIC MAMMALS

[75] Inventor: Steven L. Nissen, Ames, Iowa

[73] Assignee: Iowa State University Research Foundation, Inc., Ames, Iowa

[21] Appl. No.: 838,356

[22] Filed: Mar. 11, 1986

[51] Int. Cl.$^4$ .............................................. A61K 31/19
[52] U.S. Cl. .................................................... 514/557
[58] Field of Search ................................ 514/561, 557

[56] References Cited

U.S. PATENT DOCUMENTS

| | | | |
|---|---|---|---|
| 4,100,161 | 7/1978 | Walser | 424/274 |
| 4,100,293 | 7/1978 | Walser | 424/274 |
| 4,677,121 | 6/1987 | Walser et al. | 514/561 |

OTHER PUBLICATIONS

Chawla et al.–*J. Nutr.*, (1975), 105:798–803.
Chow et al.–*J. Nutr.*, (1974), 104:1208–1214.
Sapir et al. (1977), Metabolism, vol. 26, No. 3.
Walser, (1983), New Aspects of Clinical Nutrition, (pp. 319–324), "Nitrogen Sparing Effects of Branched Chain Ketoacids" (Karger, Basel).
Boebel et al., (1982), J. Nutr., 112:1929–1939.
Abras et al., (1982), Kidney Internation, 22:392–397.
Walser, (1984), Clinical Science, 66:1–15, Editorial Review, "Therapeutic Aspects of Branched-Chain Amino and Keto Acids".

*Primary Examiner*—Frederick E. Waddell
*Attorney, Agent, or Firm*—Tilton, Fallon, Lungmus & Chestnut

[57] ABSTRACT

Lactating domestic mammals are fed ketoisocaproate (KIC) with a diet containing limited leucine to improve the quantity and quality of the milk produced. This feeding method is particularly applicable to dairy cattle but also can advantageously be used with nursing domestic animals including cattle, sheep, goats, horses, and swine.

18 Claims, No Drawings

METHOD OF FEEDING KETOISOCAPROATE TO LACTATING DOMESTIC MAMMALS

FIELD OF INVENTION

The field of this invention is the feeding to lactating domestic mammals to improve the quantity and/or quality of the milk produced. The method is particularly concerned with the feeding of lactating dairy cattle for commercial milk production. However, it is also concerned with the feeding of nursing domestic mammals, including cattle, sheep, swine and goats. The invention is also particularly concerned with the feeding of ketoisocaproate (KIC) to domestic animals in conjunction with the feeding of protein.

BACKGROUND OF INVENTION

Keto analogs of essential amino acids have been proposed for use in human nutrition as partial or complete substitutes for the corresponding amino acids, including, for example, leucine, isoleucine, methionine, phenylalanine, and valine. Originally, the use of such keto analogs was proposed by Dr. MacKenzie Walser as supplementation to protein-reduced diets in uremia. See, for example, Walser et al. *J. Clin. Inv.* (1973) 52:678–690. Further experiments by Walser and associates demonstrated a nitrogen sparing effect from mixtures of branched-chain keto acids. Saiper and Walser, *Metabolism* (1977) 26:301–308. Patents have issued to Walser on the use of keto analogs of essential amino acids for promotion of protein synthesis and suppression of urea formation in humans. (U.S. Pat. Nos. 4,100,161 and 4,101,293). A recent review summarized existing knowledge with respect to the administration of branched-chain keto acids to humans. "New Aspects of Clinical Nutrition," pp. 319-324 (Karger, Basel, 1983).

The keto acid analog of L-leucine is alpha-ketoisocaproate (KIC) which is also sometime referred to as "keto-leucine." KIC does not have L and D forms as does leucine. It is known that there is an interconversion of circulating KIC and leucine. Published studies have demonstrated that KIC can be substituted in animal diets for leucine providing that larger molar amounts of KIC are used.

Chawla et al. reported that weight loss by rats being fed a diet deficient in leucine could be prevented by adding KIC to the diet, but the efficiency of substitution was only 20 to 27%. *J. Nutr.* (1975) 105:798-803. Other studies in rats have demonstrated that KIC is utilized less efficiently than leucine. Boebel et al. reported that the efficiency of KIC was only about 56% with reference to leucine. Boebel and Baker, *J. Nutr.* (1982) 112:1929-1939. Chow et al. obtained comparable results, reporting that substitution of KIC for leucine reduced feed efficiency by approximately 33%. Chow and Walser, *J. Nutr.* (1974) 104:1208-1214.

Walser and associates have published a study of the oral dosing of KIC to rats in which an increased efficiency of utilization of nitrogen was apparently observed. Abras and Walser, *Am. J. Clin. Nutr.* (1982) 36:154-161. There are no known reports describing the feeding of KIC to domestic lactating mammals.

SUMMARY OF INVENTION

This invention is based on the discovery that the quantity and quality of milk produced by lactating domestic mammals can be improved by orally administering alpha-ketoisocaproate (KIC). When the KIC is fed in effective amounts, the amount of milk in the milk yield is significantly increased and also its butterfat content. Improving the milk production of dairy cattle is the most important commercial application of the invention, but it can be advantageously used for other purposes. It can be employed with goats being fed for milk production. Further, the invention is generally applicable to improving the quantity and quality of milk of nursing mammals, including female ruminants like cattle, sheep, and goats, and also nonruminant mammals such as swine.

The invention is preferably practiced by combining the KIC in the form of a nutritionally utilizable salt with a protein-providing animal feed. The animal feeds employed are preferably limited in leucine content. Preferably, the feed composition should contain not over 12% of leucine based on the protein, or, more generally, not over 12% based on the protein of the total diet being fed to the domestic mammal. In particular, the total diets and feed compositions containing less than 10% leucine based on total protein are believed to be particularly desirable.

DETAILED DESCRIPTION

The method and feed compositions of this invention are particularly applicable to dairy cattle being managed for commercial milk production. However, the method and feed compositions also can be advantageously used with lactating goats fed for commercial milk production. In addition, the invention provides a means for improving the milk produced by nursing mammals, including cattle, sheep, goats, horses and swine. The young mammals being nursed thereby obtain the benfits of greater milk production and increased butterfat content.

Alpha-ketoisocaproate (KIC) is available commercially or can be synthesized by known procedures. KIC in the form of its sodium or calcium salts can be purchased from SOBAC, 336 Rue Saint-Honore, Paris, France, and/or through Sigma Chemical Company, St. Louis, Mo.

For the purposes of the present invention, the KIC should be in an edible nutritionally-absorbable form. For example, it may be used as its sodium, potassium, ammonium, or calcium salt. Ammonium and alkali metal salts are more water-soluble, while alkaline earth metal salts such as calcium salt are less water-soluble. These differences in solubility are not significant in ruminant feeding where it has been found that the calcium salt and sodium salt are comparably effective. For non-ruminants (swine, goats, etc.), the more water-soluble KIC salts are preferred.

Sodium and calcium salts of KIC as supplied commercially are substantially pure compounds and are in the form of dry powders. However, high purity is not required for the purposes of the present invention. The KIC powders can be easily mixed with dry feeds for domestic animals. The water-soluble KIC salts can alternatively be administered by dissolving in drinking water. But to assure administration at desired levels, it is preferred to mix the dry KIC salt with the dry feed ingredients at predetermined concentrations.

The KIC salt can be incorporated by dry blending using standard mixing equipment. The KIC should be substantially uniformly distributed throughout the feed. After mixing, if desired, the feed material may be further processed, such as by conversion to pellets.

In general the feed compositions for domestic mammals will be composed of mixtures of feed ingredients. The feed compositions may comprise complete feeds, feed concentrates, or protein feed supplements, such as soybean meal. It is important, however, to omit or at least to use only limited quantities of proteinaceous feed ingredients which are high in leucine content. Such feed ingredients include meat meal, blood meal and corn gluten meals, which may contain as much as 16 to 20% leucine. In contrast, soybean meal contains only about 8 to 9% leucine. For the purpose of the present invention, it is believed desirable to limit the amount of leucine in the total diet of the animal to not over 12% by weight based on the dry weight of the total protein being consumed by the animal. The amount of protein can be calculated by determining nitrogen and multiplying by the standard conversion factor of 6.25 (N×6.25). In preferred embodiments the amount of leucine is limited to less than 10% by weight of the total protein on a dry matter basis. Consequently, in the formulation of complete feeds or feed concentrates which are to provide a major portion of the diet of the animal, it is preferred to maintain the leucine content of the feed composition to not over 12% based on the total protein dry weight, and preferably at less than 10% on the same basis.

In its broadest aspect, the method of this invention comprises orally administering to lactating domestic female mammals from 2 to 1000 milligrams (mg) of sodium alpha-ketoisocaproate (KIC) (or equivalent) per kilogram (kg) of body weight per 24 hours (hrs), while limiting the dietary intake of leucine as described above. In preferred embodiments, the amount of sodium KIC (or equivalent) administered to the lactating mammals is from 10 to 400 mg per kg body weight per 24 hours. For monogastric mammals, such as swine, a preferred range is from 10 to 30 mg (no KIC) per kg body weight.

For definitive accuracy the above KIC weight ranges are specified in terms of the sodium salt of KIC. However, other salts such as the calcium salt can be employed in corresponding molar amounts. For purposes of the present application, the specified weight amounts of KIC are understood to be in terms of the sodium salt of KIC or molar equivalent amounts of the calcium salt or other salts or derivatives providing nutritionably absorbable and utilizable KIC.

When the KIC is combined with the feed material as a uniform admixture, as preferred, and the feed composition is intended to provide the major protein source for the animal's diet, the amount of KIC may alternatively be specified in relation to the feed composition. For example, the admixed feed composition may contain from 0.01 to 2.0 wt % KIC (sodium KIC basis) in relation to the dry weight of the feed composition. In preferred embodiments, such as in the formulation of complete feeds or feed concentrates, the feed compositions preferably contain from 0.05 to 1.5 wt % KIC (sodium KIC basis) in relation to the dry weight of the feed composition. For monogastric mammals such as swine preferred amounts are 0.05 to 0.15% no KIC/feed dry weight. Such feed compositions will usually contain at least 10% protein and may contain up to 24% protein (N×6.25).

With reference to cattle and sheep, it has been determined that KIC to some extent is degraded in the rumen and therefore in the oral administration of KIC to ruminants it is desirable to be certain to employ effective amounts, either using sufficient excess to allow for the loss in the rumen, or by using the KIC in a form protected against rumen metabolism. For example, KIC may be coated with animal blood or with corn protein (zein) Other proteins can also be employed as coating materials, providing the protein is resistant to rumen breakdown. Polymer coatings may also be used such as those known to protect protein against rumen destruction. For example, see coatings described in the U.S. Pat. Nos. 4,181,708, 4,181,709, and 4,181,710. The coating employed should be one which is insoluble in the slightly acid environment of the rumen and resistant to microbial degradation while dissolving in the more acid environment of the abomasum or in the neutral and proteolytic environment of the small intestine. By employing such coatings, the effectiveness of the KIC can be increased several fold. In general, within the ranges stated and depending on the form in which the KIC is administered, the amount required for effective results can be obtained by increasing the dosage until an appreciable reduction in plasma cortisol is obtained. Minimized cortisol levels are believed to correspond with maximized benefits of the KIC administration.

The method of this invention is further illustrated by the following examples.

EXPERIMENTAL EXAMPLE

The effects of alpha-ketoisocaproate (KIC) on lactation in dairy cattle were studied as follows:

Eight Holstein and four Brown Swiss cows were assigned randomly (blocking for lactation number and breed) to either a control or treatment group. Four of the Holsteins and two of the Brown Swiss were in their first lactation and all cows were between 134–283 days into lactation (mid-lactation). Cows were milked twice daily (2:30 a.m. and 2:00 p.m.).

Cows were fed ad libitum a total mixed ration twice daily (7:30 a.m. and 5:30 p.m.) with feed refusals collected before the morning feeding. The diet consisted of 41% chopped alfalfa hay, 18% corn silage, and 41% grain mix (as a % of the dry matter). The grain mix was calculated to contain 1.55 Mcal NE/kg dry matter and 16% crude protein. A major portion of the grain protein was from expeller processed soybean meal with higher than usual bypass characteristics. The cows were consuming protein in excess of their normal requirements. The grain ration contained an estimated 10% leucine (total protein basis), and the complete diet contained an estimated 9% leucine (total protein basis).

During the treatment period half the cows received Na-KIC at 0.75% of the diet dry matter. KIC was fed in a mixture which consisted of Na-KIC, corn gluten meal, hydrogenated soy oil and paraffin in a ratio of 2:1.0:0.9:0.1. The mixture was extruded and formed into crumbles. At least part of the KIC may have escaped rumen degradation with this treatment. Additionally, 100 units of tocopherol were added per gram of Na-KIC to prevent oxidation of KIC. Control animals were fed an equivalent amount of the same mixture but without KIC added.

During the first two weeks of the experiment (control period; designated weeks -2 and -1), all cows received the same diet. The trial period extended over the next three weeks (weeks 1, 2, 3) during which cows received either the KIC or control mix top-dressed on their diets twice per day (half the dose in the morning, half in the evening). Throughout the experiment, daily milk yield, milk composition and feed consumption was measured for each cow. At the end of the control period and at the end of the treatment period, urinary catheters were inserted and total urine and fecal collections were made for 48 hrs. Results of production and nitrogen balance studies were analyzed statistically using each cow as her own control. The trial effect was measured by subtracting the average control period value from the value during the treatment period. ANOVA was used to detect differences beween the KIC-fed and control groups.

The results are presented below in Table A. In summary, feed intake and body weight were not affected by KIC supplementation. Cows fed KIC had higher milk yields (+5%, $p<0.15$) with a higher percent milk fat (+4%, $p<0.04$) than control cows. The resulting milk fat yield was increased 10% ($p<0.01$) above the controls. Milk from cows fed KIC also tended to contain less cholesterol than milk from controls. Nitrogen balance data suggests more efficient utilization of dietary nitrogen by KIC-treated animals.

TABLE A

|  | Diet | Pre | Post | Change (Pre-Post) | KIC effect | % change | Sig. level |
|---|---|---|---|---|---|---|---|
| NITROGEN COMPONENT: | | | | | | | |
| Feed intake (g N/day) | control | 492 | 529 | +37 | −9 | −2% | NS |
|  | KIC | 538 | 566 | +28 | | | |
| Urine output (g N/day) | control | 180 | 195 | +15 | −15 | −8% | NS |
|  | KIC | 186 | 186 | 0 | | | |
| Feces output (g N/day) | control | 173 | 174 | +1 | −8 | −4% | NS |
|  | KIC | 186 | 180 | −6 | | | |
| Body storage (g N/day) | control | 23 | 41 | +18 | +8 | +24% | NS |
| (N balance) | KIC | 34 | 60 | +26 | | | |
| Milk output (g N/day) | control | 115 | 118 | +3 | +6 | +5% | NS |
|  | KIC | 131 | 140 | +9 | | | |
| MILK PARAMETERS: | | | | | | | |
| Milk yield (kg/day) | control | 20.0 | 19.9 | −.13 | +1.10 | +5.1% | $P < .15$ |
|  | KIC | 23.0 | 23.9 | +.97 | | | |
| Milk fat percent | control | 3.89 | 3.92 | +.03 | +.17 | +4.3% | $P < .04$ |
|  | KIC | 4.07 | 4.27 | +.21 | | | |
| Milk protein percent | control | 3.40 | 3.53 | +.13 | −.03 | −0.8% | NS |
|  | KIC | 3.35 | 3.46 | +.11 | | | |
| Milk fat yield (kg/day) | control | .77 | .77 | +.00 | +.09 | +10.4% | $P < .01$ |
|  | KIC | .92 | 1.00 | +.09 | | | |

COMMERCIAL EXAMPLES

The following feed compositions are illustrative of diets which may be used in practicing the invention.

DIET A
Complete Dairy Cattle Ration

Feed each cow:
12 lbs. early bloom alfalfa hay (17.5% crude protein, dry matter basis) 40 lbs. corn silage +
4.3 lbs. grain mix for each 10 lb. milk (3/5% fat) produced in excess of 25 lb. milk For grain mix, blend together:

| | | lbs. ton |
|---|---|---|
| 51% | coarse ground yellow corn | 1020 |
| 13% | coarse ground oats | 260 |
| 30% | solvent-soybean meal (44%) | 600 |
| 3% | cane molasses | 60 |
| 0,5% | dicalcium phosphate | 10 |
| 0.5% | calcium carbonate | 10 |
| 0,5% | salt | 10 |
| 0,3% | trace mineral-vitamin mix | 6 |
| 1.2% | Ca-KIC | 24 |
| | | 2000 |

DIET B
Feed Concentrate for Lactating Sheep or Goats

To be used with sheep or goats being fed a 14% C.P. (d.m. basis) alfalfa-grass mixed hay ad lib. Feed 2.3 lbs concentrate per day to sheep weighing 130 lbs and nursing twins. Animals fed 2.3 lbs will consume 20 g Ca-KIC per day. This is about 0.8% of the total ration dry matter intake.

For concentrate, mix together

| and pellet: | | pounds/ton |
|---|---|---|
| 89.5% | ground yellow corn | 1790 |
| 6.5% | solvent-Soybean Meal (44%) | 130 |
| 0.9% | Dicalcium phosphate | 18 |
| 0.3% | Calcium Carbonate | 6 |
| .5% | salt | 10 |
| .3% | Trace mineral-vitamin mix | 6 |
| 2.0% | Ca-KIC | 40 |

DIET C
Lactating Swine Ration*

| Mix: | | pounds/ton |
|---|---|---|
| 84% | Ground yellow corn | 1680 |
| 13% | Solvent-extracted Soybean Meal (48.5%) | 260 |
| 0.8% | Calcium carbonate | 16 |
| 1.1% | Dicalcium phosphate | 22 |
| 0.5% | Iodized salt | 10 |
| 0.5% | Trace mineral-vitamin mix | 10 |
| 0.1% | Na-KIC | 2 |

*15.6% CP, d.m. basis

I claim:

1. The method of feeding lactating female domestic mammals to increase the quantity of milk produced and/or to increase the butterfat content of the milk, in which said lactating mammals are fed a protein-containing feed composition, wherein the improvement comprises orally administering to said lactating mammals from 2 to 1000 milligrams (mg) of alpha-ketoisocaproate (sodium KIC basis) per kilograms (Kg) of body weight per 24 hours (hrs) while limiting the dietary intake of leucine to not over 12% of the dry weight of the total protein being fed to the mammals.

2. The method of claim 1 in which from 10 to 400 mg of KIC (sodium KIC basis) are administered per Kg body weight per 24 hrs.

3. The method of claim 1 in which said leucine intake is limited to less than 10% of the dry weight of the total protein being fed to the mammals.

4. The method of claim 1 in which said lactating mammals are dairy cattle being fed for commercial milk production.

5. The method of claim 1 in which said lactating mammals are being fed to produce milk for nursing young mammals.

6. The method of claim 1 in which said lactating mammals are selected from the group consisting of cattle, sheep, swine, and goats.

7. The method of feeding lactating domestic mammals to increase the quantity of milk produced and/or increase the butterfat content of the milk, in which the mammals are fed an admixed feed composition containing at least 10% protein by weight on a dry matter basis, wherein the improvement comprises incorporating alpha-ketoisocaproate (KIC) in said feed composition prior to feeding to said mammals in the amount of from 0.01 to 2.0 weight percent (wt %) based on sodium KIC and the dry weight of the feed composition, said feed composition containing not over 12 wt % leucine based on the total protein.

8. The method of claim 7 in which from 0.5 to 1.5 wt % of KIC (sodium KIC basis) is incorporated in said feed composition.

9. The method of claim 7 in which said KIC is in the form of its sodium salt.

10. The method of claim 7 in which said KIC is in the form of its calcium salt.

11. The method of feeding lactating dairy cattle to increase the quantity of milk produced and/or increase the butterfat content of the milk, in which the cattle are fed an admixed feed composition containing from 12 to 22% protein by weight on a dry matter basis, wherein the improvement comprises incorporating alpha-ketoisocaproate (KIC) in said feed composition prior to feeding to said dairy cattle in an amount of from 0.01 to 2.0 weight percent (wt %) of KIC based on sodium KIC and the dry weight of the feed composition, said feed composition containing not over 10 wt % leucine based on the dry weight of the total protein therein.

12. The method of claim 11 in which the admixed feed composition fed to said lactating dairy cattle contains from 0.5 to 1.5 wt % KIC based on sodium KIC and the dry weight of the feed composition, and said KIC is selected from the group consisting of sodium KIC and calcium KIC.

13. The method of claim 1 in which said KIC is orally administered without rumen protection thereof, the amount administered being effective to increase the quantity of milk produced, and/or being effective to increase the butterfat content of the milk.

14. The method of claim 1 in which said KIC is orally administered in a rumen-protected form, the amount so administered being effective to increase the quantity of milk produced, and/or being effective to increase the butterfat content of the milk.

15. The method of claim 7 in which said KIC is incorporated in said feed composition without rumen protection thereof, the amount of KIC so incorporated being effective to increase the quantity of milk produced, and/or being effective to increase the butterfat content of the milk.

16. The method of claim 7 in which said KIC is incorporated in said feed composition in a rumen protected form, the amount of KIC so incorporated being effective to increase the quantity of milk produced, and/or being effective to increase the butterfat content of the milk.

17. The method of claim 11 in which said KIC is incorporated in said feed composition without rumen protection thereof, the amount of KIC so incorporated being effective to increase the quantity of milk produced, and/or being effective to increase the butterfat content of the milk.

18. The method of claim 11 in which said KIC is incorporated in said feed composition in a rumen-protected form, the amount of KIC so incorporated being effective to increase the quantity of milk produced, and/or being effective to increase the butterfat content of the milk.

* * * * *